3,107,187
PROPELLANT COMPOSITIONS
Keith E. Rumbel, Falls Church, and Arch C. Scurlock and Raymond Friedman, Alexandria, Va., assignors to Atlantic Research Corporation, Alexandria, Va., a corporation of Virginia
No Drawing. Filed Feb. 5, 1959, Ser. No. 791,485
17 Claims. (Cl. 149—22)

This invention relates to new heterogeneous monopropellant compositions capable of generating gases containing high available energy for such purposes as producing thrust or power, heat energy or gas pressure. More specifically it relates to plastic, extrudable, shape-retaining monopropellant compositions containing nitrocellulose as a gelling agent.

The term monopropellant refers to a composition which is substantially self-sufficient with regard to its oxidant requirements as distinguished from bipropellants where the fuel is maintained separately from the oxidizer source until admixture at the point of combustion. By heterogeneous is meant a two-phase system wherein a finely divided, solid oxidizer is dispersed in a liquid fuel in which the oxidizer is insoluble.

A heterogeneous plastic monopropellant, which can be extruded under pressure into a combustion chamber in the form of a continuously advancing, shape-retaining cohesive mass or column and there ignited so that the leading face of the advancing mass burns to generate hot, high pressure combustion gases, combines many of the advantages of both liquid and solid propellants and eliminates many of their disadvantages.

The object of this invention is to provide stable, high density, heterogeneous, extrudable monopropellant compositions containing a nitrocellulose gelling agent, which are particularly advantageous for extrusion as cohesive, shape-retaining continuously advancing masses into a combustion chamber, where they are burned to generate high energy gases for developing thrust or power or for providing heat or gas pressure.

Another object is to provide heterogeneous plastic monopropellants gelled with nitrocellulose, which can be tailored by a wide variety of component formulations to meet different performance requirements.

Other objects and advantages will become obvious from the following detailed description.

Broadly speaking, the monopropellant compositions comprise stable dispersions of finely divided, insoluble, solid oxidizer in a continuous matrix of a non volatile liquid fuel gelled with nitrocellulose, the gel composition having sufficiently high cohesive strength to form a plastic mass which maintains the solid oxidizer in stable, uniform dispersion, and which, while capable of continuous flow at ordinary to reduced temperatures under stress, nevertheless retains a formed shape for an appreciable length of time. The gel compositions possess characteristics of non-Newtonian liquids, namely yield to flow only under a finite stress.

These high density, plastic monopropellants are particularly adapted to being fed at ambient temperatures under pressure from a storage chamber into a combustion chamber in the form of any desired continuous coherent shape, such as a column, strip, or the like, with combustion taking place on the leading face of the advancing material. Such a plastic, two-phase system, in which the solid oxidizer is uniformly dispersed in a continuous liquid matrix, ensures smooth coherent flow and, very importantly, a constant mass burning rate for a given area of exposed burning surface. In this respect, the burning properties are similar to those of a solid propellant grain.

The shape-retentive cohesiveness of the monopropellant material should preferably be sufficiently high so that it possesses a minimum tensile strength of about 0.01 p.s.i. and preferably about 0.03 p.s.i. or higher. The material should, however, be capable of yielding to continuous flow at ordinary to reduced temperatures under stress or pressure. The use of excessively high pressures to produce the requisite flow is undesirable for practical reasons, although available pressure-producing devices will, of course, vary with particular applications. The maximum shear stress at a wall required to initiate and sustain flow of the composition at ordinary or ambient temperatures is preferably not higher than about 1 p.s.i. with a maximum of about 10 p.s.i.

Solution in the liquid fuel matrix of an agent which promotes gelation is a very helpful expedient for obtaining or improving the desired physical properties of the two-phase, plastic, monopropellant composition, in terms of shape-retentive cohesiveness, tensile strength, thixotropy, and freedom from separation or sedimentation of the dispersed solids during storage or under the vibrational, accelerational, or other stresses in the combustion chamber.

Nitrocellulose is particularly suitable for use as a gelling agent. Not only does it improve the aforedescribed physical properties of the monopropellant, but it possesses other desirable characteristics which make its use particularly advantageous.

Nitrocellulose is soluble in and compatible with many non-volatile liquid fuels, both of the inert type, such as triacetin, which requires an external oxidizer for combustion, and of the active or self-oxidant type, namely liquids which contain combined oxygen available for combustion of other components of the molecule, such as nitroglycerine. This makes possible a wide variety of propellant formulations tailored to specific use requirements.

Another important advantage of nitrocellulose as a gelling agent stems from the fact that it is self-oxidant, namely contains oxygen available for combustion of the carbon and hydrogen in the molecule. This eliminates the need for providing oxidizer to meet the oxygen requirements of the gelling agent, making all of the solid oxidizer available to meet the demands of the inert fuel components of the mixture, such as the inert liquid fuel component and, if present, a finely divided metal fuel. Thus the nitrocellulose gelling agent improves the oxygen balance, making stoichiometric oxygen levels, and in some cases, higher than stoichiometric oxygen levels, more easily obtainable, and broadening the spectrum of utilizable liquid and other fuels. It reduces, for example, the difficulty ordinarily experienced in incorporating sufficient solid oxidizer for stoichiometric oxidation of fuels of high oxygen demand such as liquid hydrocarbons.

The compatibility and solubility of nitrocellulose in non-volatile, self-oxidant liquids, such as nitroglycerine, further increases the versatility of the heterogeneous plastic monopropellants.

The non-volatile liquid component, which is gelled with the nitrocellulose, can consist entirely of an inert liquid fuel, namely one which requires an external oxidizer for combustion, or it can comprise up to 90% by weight of an active self-oxidant liquid component, such as nitroglycerine, the remainder being an inert liquid fuel component to reduce shock-sensitivity of the propellant composition.

Where a very high safety factor is a prime consideration, the liquid vehicle preferably consists entirely of an inert fuel or the inert liquid diluted with up to about 50%, preferably up to 30 or 40%, by weight of total liquid, of a self-oxidant liquid. Monopropellant compositions of this character possess such high autoignition temperatures, and low heat and shock sensitivity, that the hazards of handling, transportation, and storage are reduced to a minimum. The addition of the self-oxidant liquid can be used as an expedient for improving oxygen balance or to make possible the use of inert liquids of high oxygen demand, since the active liquid component functions as a fluid vehicle for the solid oxidizer, thereby helping to provide the requisite continuous liquid matrix, and reduces the total amount of solid oxidizer required in the mixture for stoichiometric oxidation of the reduced proportion of inert fluid fuel.

Compositions employing inert liquid fuel vehicles or liquid vehicles comprising an inert component and up to 50% of an active component, can generally be loaded with any desired amount of solid oxidizer up to stoichiometric levels and, where substantial amounts of a self-oxidant liquid are employed, to higher than stoichiometric levels, it being again noted that the nitrocellulose present improves the oxygen balance. Such heterogeneous monopropellants, by suitable choice of the liquid and oxidizer components and their concentrations, can be tailored to meet requirements for most gas-generation applications, in terms, for example, of combustion gas temperatures, rate of gas generation, specific impulse, and the like. Stoichiometric oxidizer levels, though not always essential, are generally desirable for applications where maximum heat release is the objective, as, for example, in the case of rocket propulsion.

In some applications relatively low combustion gas temperatures are required, as in turbines and reciprocating engines where excessively hot gases damage the moving parts. In such cases, the amount of oxidizer can be reduced below stoichiometric, so long as the amount used is sufficient to maintain active combustion and a desired level of gas generation. The problem here is to minimize incompletely oxidized products, such as carbon, which produce undesirable solid accumulation in the gas generator device. The use of nitrocellulose as the gelling agent is advantageous since it minimizes soot formation.

Addition of relatively large amounts of self-oxidant liquid vehicle, together with the self-oxidant nitrocellulose gelling agent, makes possible the preparation of heterogeneous plastic monopropellants which are oxygen-rich, namely contain more than the stoichiometric solid oxidizer requirement for complete oxidation of the inert fuel component, so that free oxygen gas is produced as a decomposition product of the oxidizing agent. Unlike fuel-rich propellants, the oxygen-rich compositions have the advantage of providing sufficient oxygen for complete combustion which eliminates the undesirable accumulation of soot and the after-burning of combustible exhaust gases, such as CO and $H_2$, after venting from the combustion chamber.

Still another advantage for some applications, such as in catapult launching, particularly when combined with freedom from soot and after-burning of exhaust gases, stems from the fact that the excess, free oxygen gas dilutes the hot gaseous combustion products and, being substantially cooler, reduces combustion chamber temperature. The more oxygen gas available, the more effective is the cooling action. This can be achieved by maximizing the amount of solid oxidizer present in the mixture and minimizing the proportion of oxidizer required for oxidation of inert fuel components. The ideal composition, from this point of view is one consisting entirely of an active self-oxidant liquid, such as nitroglycerine, gelatinized with nitrocellulose and loaded to capacity with a solid oxidizer so that the latter is utilized substantially entirely for the generation of free oxygen gas. It is preferable, however, to phlegmatize the self-oxidant liquid with about 10 to 20% of an inert, liquid fuel. The actual amount of self-oxidant liquid required and the degree of free oxygen formation varies, of course, with the particular solid oxidizer and the particular active and inert liquid components. Optimum results are obtained with inert liquid fuels containing combined oxygen which is not available for combustion, such as carbon-linked oxygen, as in esters and alcohols, but which reduces the stoichiometric oxygen requirements for the remainder of the molecule.

A plastic gel composition comprising 75% by weight of finely divided ammonium perchlorate dispersed in 25% of a soft gel comprising 10 parts nitrocellulose (12.6% nitrogen) and 90 parts of a mixture of nitroglycerine and triacetin in an 80:20 ratio, provides, after complete oxidation of the carbon and hydrogen present, free oxygen for dilution and cooling of the combustion gases, equal to 34.6% of the total oxygen present.

Finely divided metal powders, such as Al, Mg, Zr, B, Be, Ti, and Si, can be introduced into the monopropellant compositions as an additional fuel component along with the liquid fuel. Such metal powders possess the advantages both of increasing density and improving specific impulse of the monopropellant because of their high heats of combustion. The metal particles should preferably be within a size range of about 0.25 to 50 microns. The amount of such fuel added is not critical, but is determined largely by the specific use and the requisite physical characteristics of the composition. Even very minor additions, e.g. 1 or 2% by weight, increase density and heat of combustion. In general, the metal will constitute a minor proportion by weight of the propellant composition, maximum limits being set by the need to avoid granulation of the mixture and an excessive deficiency in amount of oxidizer.

The presence of finely divided metal even at less than stoichiometric oxidizer levels is beneficial in many applications because of the increased density and heat release. Substantial amounts can be effectively employed in the propellant compositions containing only an inert liquid fuel, particularly because of the improved oxygen balance provided by the nitrocellulose.

However, the more metal which can be added at or close to stoichiometric oxidation levels, the greater is the total heat release and specific impluse of the monopropellant. The addition of an active liquid, such as nitroglycerine, which functions as a fluid matrix vehicle for the metal and which, by virtue of its self-oxidant properties, increases the proportion of solid oxidizer available for oxidation of the metal fuel, makes possible the formulation of plastic monopropellants of exceedingly high specific impulse, the degree of which increases with increasing ratio of self-oxidant liquid, the maximum being reached when all of the liquid fuel is self-oxidant. However, for practical reasons of safety in handling, the active liquid vehicle is preferably phlegmatized with at least about 10 to 20% of an inert liquid fuel. Since the gelled liquid matrix can be loaded with as much as 80 to 90% of dispersed solids by weight of the total composition, while retaining the requisite continuous liquid matrix and other physical properties aforedescribed necessary for the extrudable plastic monopropellant, it will be seen that this invention makes possible the formulation of propellants of exceedingly high performance for applications such as rockets.

The amount of nitrocellulose employed is determined by a variety of factors, such as the particular optimum physical properties for a given application, e.g. the degree of cohesiveness and tensile strength within extrudable limits, and the particular components and their concentrations, e.g. the gelling characteristics of the specific liquid fuel vehicle, the kind, particle size, and amount of finely divided solid oxidizer and other solid component, such as finely divided metal. The concentration of the gelling agent should, however, not be so high as to cause solidification of the composition, so that it will not readily extrude at ambient temperatures. The maximum shear stress at a wall required to initiate and sustain flow of the composition at ordinary or ambient temperatures is preferably not higher than about 1 p.s.i. with a maximum of about 10 p.s.i. In general, the maximum amount of nitrocellulose which can be incorporated without excessive loss of propellant plasticity is about one-quarter to one-third by weight of the liquid vehicle. In some cases, the particular liquid and the dispersed solid components may limit the amount of nitrocellulose even further. The specific amount of the gelling agent for specific formulations can be readily determined by routine testing.

The liquid fuel vehicles can be any liquid oxidizable to gaseous combustion products, which is compatible with, namely gelled by, the nitrocellulose gelling agent, and which meets the following specifications: (a) It comprises at least 10%, and in some cases, at least 50%, by weight of a stable, inert material which is insensitive to shock or impact and requires an external oxidizer for combustion. Thus the inert liquid fuel component should not contain combined oxygen as, for example, in the form of nitroso, nitro, nitrite, or nitrate radicals, which is available for oxidation of other components of the molecule, such as carbon, hydrogen, silicon or sulfur. It may, however, and often preferably does, contain combined oxygen which is not available to any appreciable extent for further oxidation, such as oxygen which is linked to a carbon, silicon, sulfur or phosphorus atom in the molecule. Up to 90% by weight, and in some cases, preferably not more than 50% or less, based on the liquid vehicle, of an active, non-volatile liquid fuel containing combined oxygen available for combustion, such as nitroglycerine, diethylene glycol dinitrate, pentaerithritol trinitrate or 1,2,4-butanetriol trinitrate can be admixed advantageously with the inert liquid fuel component. (b) The liquid fuel should be high boiling and substantially non-volatile. Its maximum vapor pressure is preferably not more than about 25 mm. Hg at 100° C. (c) The liquid fuel should be mobile, namely free-flowing, at ordinary temperatures. The desirable specific, maximum solidification temperature is determined largely by ambient temperatures at point of use of the monopropellant compositions. Generally, a maximum solidification or pour-point temperature of about −2° C. is desirable.

The presence of at least 10% of an inert, shock-insensitive liquid fuel in the liquid vehicle is generally sufficient to desensitize the propellant mixture to the point where it is safe to handle, transport, and store with conventional precautions. The concentration of inert liquid required to reduce impact-sensitivity to a desired degree will, of course, vary with the particular sensitive liquid. Shock or impact sensitivity of compositions having liquid vehicles containing 50% or more of an inert liquid fuel is of a very low order. Such monopropellants are also substantially insensitive to heat, minimum autoignition temperatures generally being at least about 175° C., namely well above any environmental temperatures likely to be encountered.

Substantial non-volatility ensures extended storageability even at relatively high environmental temperatures without loss by vaporization of the fuel component. This is essential not only to maintain the predesigned combustion characteristics of the monopropellant but also to retain its desired physical characteristics. Vaporization of sufficient liquid fuel to leave a solid, granular mass would make the monopropellant unfit for the desired mode of use.

The liquid fuel should be mobile at ordinary to reduced temperatures to make possible the desired plasticity of the monopropellant mixture at ambient temperatures of use and to prevent freezing of the monopropellant at relatively low ambient environmental temperatures of use into a non-plastic solid mass. Solidification of the composition during storage or shipping at freezing temperatures is of no concern so long as ambient temperature at time of use is above the solidification temperature, since plasticity and extrudability is restored at the higher temperature.

The inert liquid fuel is preferably an organic liquid, which, in addition to carbon and hydrogen, can contain other elements such as oxygen, nitrogen, sulfur, phosphorus or silicon, which meets the aforedescribed requirements in terms of physical and chemical properties. Such liquid fuels include hydrocarbons, e.g., triethyl benzene, dodecane, phenyl xylylethane, and the like; compounds containing some oxygen linked to a carbon atom, such as esters, e.g., butyl laurate, dibutyl phthalate, triacetin, tributyl acetyl citrate, dioctyl adipate, etc.; alcohols, e.g., benzyl alcohol, diethylene glycol, triethylene glycol, etc.; ethers, e.g., bis (dimethyl benzyl) ether, propylene glycol mono-butyl ether, ethylene glycol dibutyl ether; ketones, e.g., isophorone; acids, e.g., caproic acid, n-heptylic acid, etc.; aldehydes, e.g., cinnamaldehyde; nitrogen-containing organic compounds such as nitriles, e.g., adiponitrile; phosphorus-containing compounds, e.g., tricresyl phosphate; sulfur-containing compounds, e.g., N-ethyltoluene sulfonamide, and many others.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10% by weight. Beyond the requisite minimum any desired proportion of liquid fuel to dispersed solid can be employed, depending on the desired combustion properties, since the desired cohesive, shape-retentive properties can be obtained by the nitrocellulose gelling agent.

The solid oxidizer can be any suitable, active oxidizing agent which yields oxygen readily for combustion of the fuel and which is insoluble in the liquid fuel vehicle. Suitable oxidizers include the inorganic oxidizing salts, such as ammonium, sodium, potassium and lithium perchlorate or nitrate, metal peroxides such as barium peroxide and the like. The solid oxidizer should be finely divided, preferably with a maximum particle size of about 300 to 600 microns, to ensure stable, uniform dispersion of the oxidizer in the liquid fuel, so that it will not separate or sediment despite lengthy storage periods, although some somewhat larger particles, e.g. up to about 1000 microns, can be maintained in the gelled compositions without separation. Although not essential, a size dispersion of the particles is often desirable because of the improved packing effect obtained in terms of increased amounts of solids which can be incorporated.

The amount of solid oxidizer incorporated varies, of course, with the particular kind and concentration of fuel components in the formulation, the particular oxidizer, and the specific requirements for a given use, in terms, for example, of required heat release and rate of gas generation, and can readily be computed by those skilled in the art. The upper limit of oxidizer addition is set only by the requirement that it be dispersed in a continuous matrix of the liquid vehicle. Since the liquid vehicle can be loaded with as high as 80 to 90% of finely divided solids, stoichiometric or higher than stoichiometric oxidizer levels with respect to the inert liquid or inert liquid and metal fuel components can generally be obtained where desired, with increased latitude in choice and concentration of the inert fuel being provided by the active nitrocellulose gelling agent, with or without the addition of an active, self-oxidant liquid fuel component. As aforementioned, in some applications, stoichiometric oxidation levels may not be necessary or even desirable and the amount of oxidizer can be correspondingly reduced, it being essential only that adequate oxidizer be present to provide for active combustion of the inert fuel components and an adequate degree of gas generation for the particular use.

Other additives which can be incorporated in the monopropellant compositions include, for example, burning rate catalysts, such as ammonium dichromate, copper chromite and ferric ferrocyanide; coolants for reducing the temperatures of the generated gases where necessary, as in the case of some turbine applications, such as monobasic ammonium phosphate, barbituric acid and ammonium oxalate; and the like.

Nitrocellulose, though not readily soluble at ordinary temperatures, does dissolve in many of the non-volatile organic liquids suitable as fuel components over a period of time which varies from several hours to several days depending on the solubility characteristics of the particular grade of nitrocellulose. The nitrocellulose, in the form of particles which remain stably dispersed, can, therefore, be admixed with the liquid fuel vehicle and finely divided solid oxidizer and any other solid components, to form a relatively fluid slurry, which can be poured into the fuel storage tank or chamber, and allowed to set at ordinary temperature for a period sufficient to obtain gelation. The time required for solution of the dispersed nitrocellulose is determined by such factors as its particular solubility characteristics, its concentration, the size of the dispersed nitrocellulose particles, and the prevailing ambient temperatures, and may vary, therefore, from about 1 to several days. It is, of course, essential that the nitrocellulose particles do not separate or sediment during the setting period and that they completely solvate. This can be accomplished by employing a nitrocellulose product consisting of non-porous, spherical particles having a maximum diameter of about 100 microns and preferably a maximum weight average diameter of about 30 or 50 microns. Such particles remain uniformly dispersed and by virtue of their small size, reduce gelation time and completely dissolve before gelation inhibits penetration of the liquid solvent into the interior of the particle. Since it is desirable to maintain the propellant mixture fluid and substantially pourable until after it is introduced into the final storage tank or chamber, the nitrocellulose particles should be dense and substantially free from internal pores into which the liquid can penetrate with consequent excessively rapid loss of fluidity of the slurry.

Such a method for making the heterogeneous gel monopropellant eliminates any need for heating to induce gelation and minimizes the apparatus required to load the finished, flow-resistant, plastic monopropellant into the fuel chamber of the gas-generating device.

It is, of course, not essential that the nitrocellulose be introduced into the propellant mixture in the foregoing manner. It can, for example, be added to the liquid fuel vehicle in any granular shape, size or degree of porosity and the mixture heated to obtain rapid solution and gelation. The finely-divided solid oxidizer can then be mixed with the gelled liquid in suitable mixing apparatus to form the finished plastic monopropellant. Manufacturing operations are relatively non-hazardous, since, even where a portion of the liquid fuel is a highly active compound, dilution with the inert liquid greatly reduces shock and heat sensitivity.

EXAMPLE I 5 parts by weight of nitrocellulose were dissolved in 31 parts of triacetin. 64 parts of ammonium nitrate (14,000 r.p.m. grind) were admixed with the soft gel. The resulting mixture was a stable, cohesive, shape-retentive, extrudable composition, which showed no separation of the dispersed oxidizer when centrifuged for 30 minutes at 3170 r.p.m. The linear burning rate of the monopropellant was 0.089 in./sec. at 1000 p.s.i.

EXAMPLE II 7 parts by weight of nitrocellulose were dissolved in 28 parts of triethylene glycol. 65 parts of ammonium nitrate (21.7 parts 1725 r.p.m. grind and 43.3 parts 14,000 r.p.m. grind) and 2 parts of cobalt chloride (a burning rate catalyst) were admixed with the soft gel. The resulting mixture was a stable, cohesive, shape-retentive, extrudable composition, which showed no oxidizer separation at a centrifuge speed of 1700 r.p.m. and only a slight trace of separation at 3170 r.p.m. The linear burning rate of the monopropellant was 0.137 in./sec. at 1000 p.s.i.

Table I summarizes the composition and burning properties of formulations containing nitroglycerine as an active liquid component with and without a powdered metal.

*Table I*

| Composition | #29 | #30 |
|---|---|---|
| Nitroglycerin/dibutyl phthalate (75/25) (1% 2-nitrodiphenylamine added) | 32.96 | 24.00 |
| Nitrocellulose (12.6% nitrogen) | [1] 2.10 | [2] 1.00 |
| Ammonium perchlorate (14,000 grind) | 64.94 | |
| Ammonium perchlorate (1,725 grind) | | 45.20 |
| Aluminum | | 29.80 |
| Total | 100.00 | 100.00 |
| Autoignition temperature, °C | 175 | 180 |
| Strand burning rate data at 1,000 p.s.i.a., 77° F.: | | |
| Burning rate, in./sec | 1.00 | 0.55 |
| Pressure exponent | 0.52 | 0.89 |

[1] 6% NC.  [2] 4% NC.

The heterogeneous monopropellants in terms of specific impulse and high density, closely approach and, in some cases, even surpass the high performance levels of solid propellants. The high density produced by inclusion of the solid oxidizer and, in some cases, additionally of a finely divided solid metal fuel, makes possible a high weight/volume loading ratio as compared with conventional mobile liquid propellant, and thereby reduced storage tank capaicty requirements or increased fuel capacity, in terms of performance, for a storage chamber of given size.

The high autoignition temperature, low shock- and impact-sensitivity, non corrosiveness and non-toxicity, conferred by the inert, high-boiling, liquid fuel, make the monopropellant compositions safe to handle, to transport and to store for extended periods of time. The stable gel compositions do not leak. This is another important advantage as compared with mobile liquids in terms of reduced fire and toxicity hazard and simplification of personnel and equipment precautions.

The unique physical characteristics of the monopropellant compositions make it possible to generate gases of high available energy by extruding the material in the form of any desired coherent shape into a combustion chamber and burning the leading face of the continuously advancing shaped material. Because of the fluidity of the material under stress at ambient temperatures, the monopropellant can be fed into the combustion chamber at a rate adjusted to the desired mass burning rate of the composition so that at equilibrium or steady-state burning, namely when the mass burning rate does not vary with time, the burning surface of the continuously extruding propellant remains substantially stationary relative to the walls of the combustion chamber. Since burning is confined to a well-defined burning-surface area, much as in the case of the burning of solid propellant grains, combustion chamber length requirements are generally quite small, both as compared with that needed for complete reaction of sprayed or atomized conventional mobile liquid propellants and for housing and combustion of conventional solid propellant grains. This makes possible a substantial saving in dead weight, since the combustion chamber not only must be built to withstand the high combustion gas pressures, but must also be heavily insulated and made of materials, generally heavy, such as alloy steel or nickel alloys such as Inconel, which are resistant to the corrosive gases. Unlike solid propellant combustion chambers which must conform to design requirements of the propellant grain, the combustion chamber for use with the heterogeneous, plastic, monopropellant compositions can be designed to meet the shape or other requirements of the particular gas generator device.

Burning surface area of the extruded shape-retaining monopropellant can be predesigned and controlled by such means as varying the number, shape and size of the injection orifices and by varying the rate of extrusion of the propellant into the combustion chamber. Thus, mass burning rate of the propellant and amount and pressure of combustion gases generated can easily be regulated by controlled feeding. In this way, the rate of gas generation can be tailored to particular requirements both before and during operation within limits set by the particular properties of the monopropellant compositions and the structural limitations of the rocket, gas generator or other device. Similarly, factors affecting burning rate of the propellant material, such as its ambient temperature or pressure conditions in the combustion chamber can be compensated for by controlling feeding rate or adjustment of the size or shape of the mass of injected material.

Duration of combustion is limited only by the capacity of the monopropellant storage container and appropriate means for cooling the walls of the combustion chamber and can be continuous or intermittent. Combustion can be quenched at any time by any suitable means such as a cut-off device which closes the injection orifices. Combustion can be reinitiated by opening the shut-off mechanism and reigniting the leading face of the extruding propellant.

The stable, uniform dispersion of the finely divided solid oxidizer or oxidizer and solid metal fuel, ensures uniformity of burning rate at the constantly generating burning surface as the end-burning material advances. This is of considerable importance since it assures a constant or controllable rate of gas generation.

The cohesiveness of the shape-retaining gel composition, furthermore, generally is sufficiently high to maintain integrity of the propellant under conditions of vibration and acceleration against breaking-off or separation of portions of the extruding mass into the combustion chamber. This is of importance not only for control of the desired burning surface area but to avoid loss or wastage of unburned propellant in some applications, as, for example, rocket motors, by venting of the material out the nozzle under such conditions as high acceleration. This is frequently a problem in the case of the burning of atomized mobile liquid propellants, some unburned particles of which fly out the Venturi nozzle.

Another advantage of the monopropellants stems from their substantial non-fluidity except under stress since, unlike mobile liquids, it makes the system substantially immune to attitude. This makes unnecessary elaborate precautions to maintain the stored propellant in constant communication with the feeding orifice into the combustion chamber.

Like conventional ambient liquid monopropellants, as distinguished from liquid bipropellants, the system requires only one storage container or reservoir, one set of pressurizing means, feeding tubes and control valves, thereby simplifying the complexity of the device and reducing weight. There is also no need for combustion catalysts in the combustion chamber. Construction problems are further simplified by non-corrosiveness of the fuel.

Thus, it will be seen that the heterogeneous monopropellants of our invention combine the advantages of the conventional mobile liquid monopropellants and solid propellants and eliminate most of their disadvantages. Like solid propellants, the compositions are characterized by excellent stability, high density, low sensitivity to shock and impact, high autoignition temperatures, high specific impulse, absence of leakage, excellent storageability and system-attitude tolerance. They are free from such defects of solid propellants as the requirement of predetermined, set parameters, such as predesigned shaping and size, venting and wasting of large amounts of surplus gases, limitation as to duration of the combustion cycle, inability to compensate for ambient temperature effect on burning rate, tendency to become brittle at low ambient temperatures which frequently causes fracturing, the dangers of mechanical flaws, impracticality of reignition and intermittent action, and large combustion chamber size.

Although this invention has been described with reference to illustrative embodiments thereof, it will be apparent to those skilled in the art that the principles of this invention can be embodied in other forms but within the scope of the claims.

We claim:

1. In a heterogeneous monopropellant composition consisting essentially of a dispersion of finely-divided, insoluble, solid inorganic oxidizer in a continuous oxidizable organic fuel matrix which forms gaseous combustion products, said organic fuel matrix being selected from the group consisting of an inert carbon- and hydrogen-containing compound which does not contain combined oxygen available for combustion of other components of the molecule and requires an external oxidizer for combustion and an active organic compound which contains combined oxygen available for oxidation of other molecularly-combined components of said active compound, said active compound containing a radical selected from the group consisting of nitroso, nitro, nitrite and nitrate, said oxidizer being present in amount sufficient to maintain active combustion of the inert organic fuel compound, said organic fuel matrix containing in addition a minor amount of nitrocellulose gelling agent dissolved therein, the improvement in which said organic fuel matrix, including said dissolved nitrocellulose, is a liquid which is mobile at ordinary temperatures, which comprises at least about 8% by weight of said composition, which comprises one or more liquid components, all of which have a maximum vapor pressure of about 25 mm. Hg at 100° C., said liquid components consisting essentially of at least about 10% by weight of said inert organic compound, said inert compound being a liquid at ordinary temperatures, and from 0 to about 90% by weight of said active organic compound, said active compound being a liquid at ordinary temperatures, said monopropellant being an extrudible thixotropic composition which requires a finite stress to produce flow, is indefinitely capable of continuous flow at ambient temperatures under a maximum sheer stress at a wall of 10 p.s.i., and has a minimum tensile strength of 0.01 p.s.i.

2. The monopropellant composition of claim 1 in which the nitrocellulose is present in an amount up to about 25% by weight of the liquid fuel.

3. The monopropellant composition of claim 1 in which the solid oxidizer is present in amount sufficient to meet stoichiometric oxidation requirements of the inert liquid fuel.

4. The monopropellant composition of claim 3 in which the active liquid fuel compound is nitroglycerine.

5. The monopropellant composition of claim 1 in which the liquid fuel consists essentially of at least about 50% of said inert liquid compound and from 0 to about 50% of said active liquid compound.

6. The monopropellant composition of claim 5 in which the solid oxidizer is present in amount sufficient to meet stoichiometric oxidation requirements of the inert liquid fuel.

7. The monopropellant composition of claim 5 in which the active liquid fuel compound is nitroglycerine.

8. The monopropellant composition of claim 6 in which the active liquid fuel compound is nitroglycerine.

9. The monopropellant composition of claim 1 in which the solid oxidizer is present in substantially larger amount than that needed to meet complete oxidation requirements of the inert fuel.

10. The monopropellant composition of claim 9 in which the active liquid fuel compound is nitroglycerine.

11. The monopropellant composition of claim 1 in which a finely-divided solid fuel selected from the group consisting of powdered metal, boron and silicon in minor proportion by weight of the propellant composition is dispersed together with the solid oxidizer in the continuous gelled liquid fuel matrix, and the solid oxidizer is present in amount sufficient to maintain active combustion of the inert liquid fuel and solid finely-divided fuel components.

12. The monopropellant composition of claim 11 in which the active liquid fuel compound is nitroglycerine.

13. The monopropellant composition of claim 11 in which the finely-divided solid fuel is aluminum.

14. The monopropellant composition of claim 5 in which a finely-divided solid fuel selected from the group consisting of powdered metal, boron and silicon in minor proportion by weight of the propellant composition is dispersed together with the solid oxidizer in the continuous gelled fuel matrix and the solid oxidizer is present in amount sufficient to maintain active combustion of the inert liquid fuel and solid finely-divided fuel components.

15. The monopropellant composition of claim 14 in which the active liquid fuel compound is nitroglycerine.

16. The monopropellant composition of claim 14 in which the finely-divided solid fuel is aluminum.

17. The monopropellant composition of claim 2 in which the liquid organic fuel is triethyleneglycol gelled with nitrocellulose in an amount up to about 25% by weight of the triethyleneglycol and the oxidizer is ammonium nitrate.

References Cited in the file of this patent

UNITED STATES PATENTS

| | | |
|---|---|---|
| 2,159,234 | Taylor | May 23, 1939 |
| 2,530,493 | Van Loenen | Nov. 21, 1950 |
| 2,570,990 | Southern et al. | Oct. 9, 1951 |
| 2,690,964 | Maisner | Oct. 5, 1954 |
| 2,966,404 | Taylor et al. | Dec. 27, 1960 |
| 2,988,879 | Wise | June 20, 1961 |

FOREIGN PATENTS

| | | |
|---|---|---|
| 582,621 | Great Britain | Nov. 22, 1946 |

OTHER REFERENCES

Chem. and Eng. News, January 6, 1958, pp. 79–81.
Chem. and Eng. News, May 27, 1957, pp. 18–22.
Jet Propulsion, Air Technical Service Command (1946), pp. 151–2.